Figure 1:
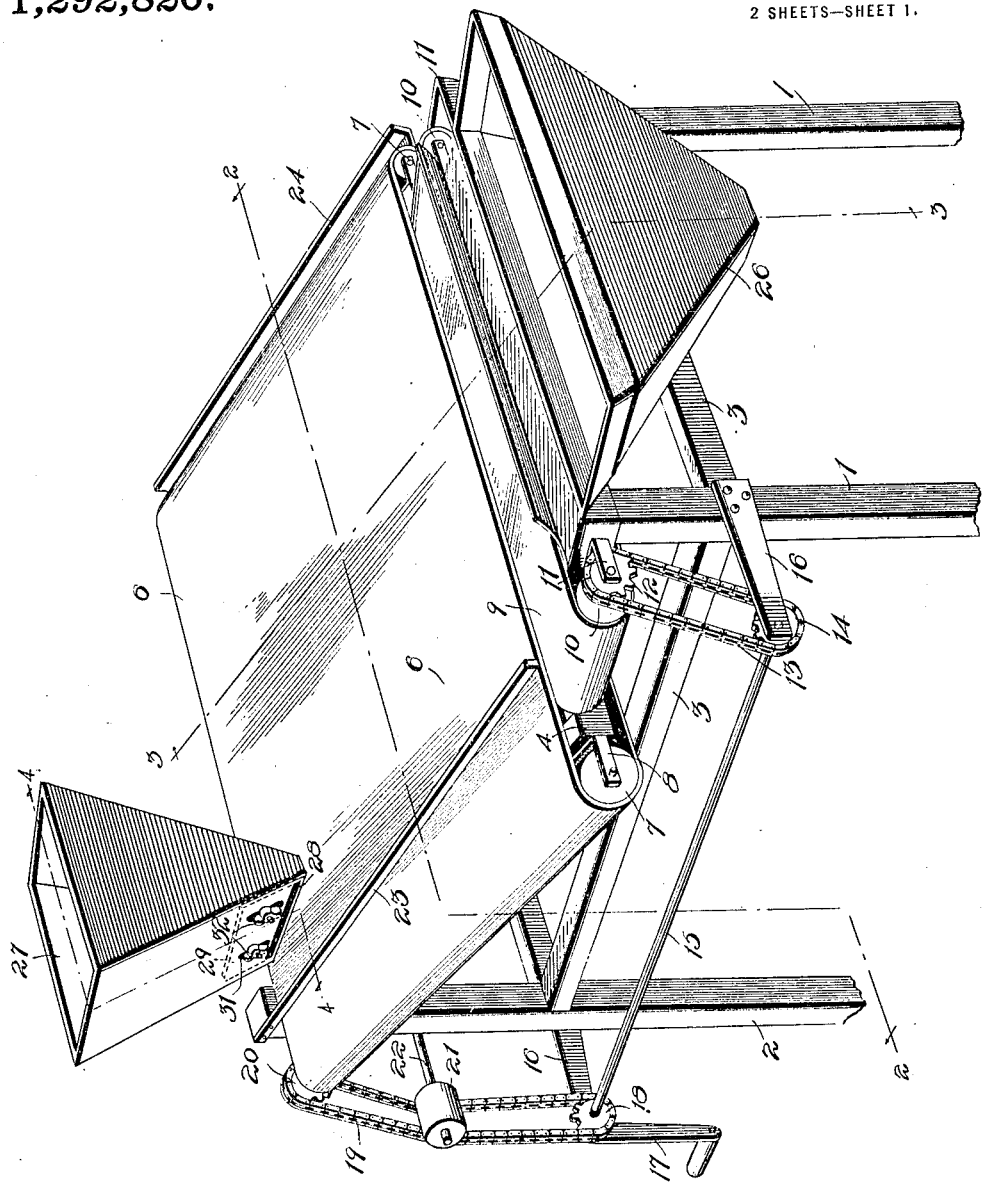

H. B. LINDSLEY.
SEPARATOR.
APPLICATION FILED MAY 11, 1918.

1,292,820.

Patented Jan. 28, 1919.
2 SHEETS—SHEET 1.

WITNESSES
George C. Wijers.

INVENTOR
H.B. Lindsley,
BY
ATTORNEYS

H. B. LINDSLEY.
SEPARATOR.
APPLICATION FILED MAY 11, 1918.
1,292,820.
Patented Jan. 28, 1919.
2 SHEETS—SHEET 2.
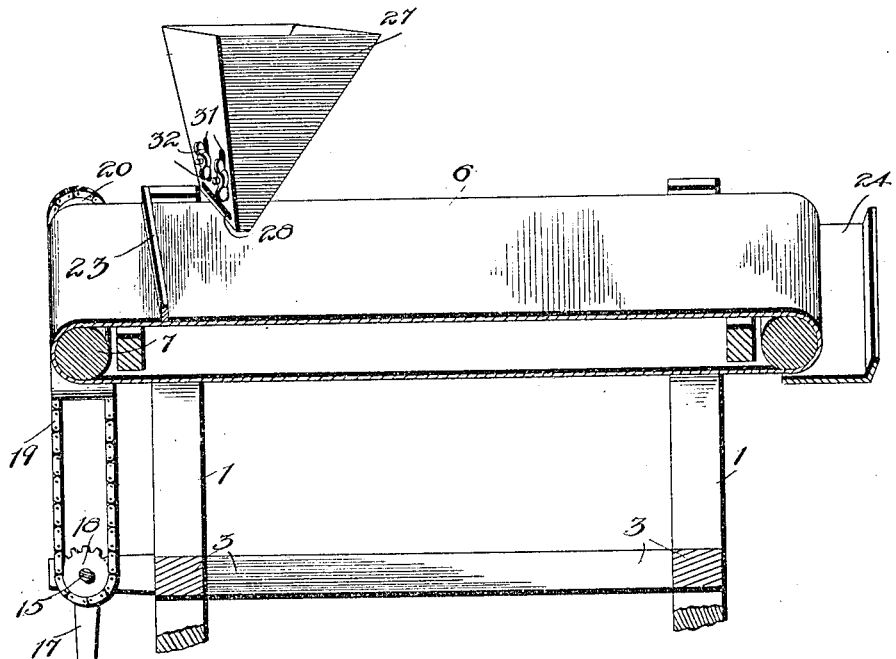
Fig. 2.
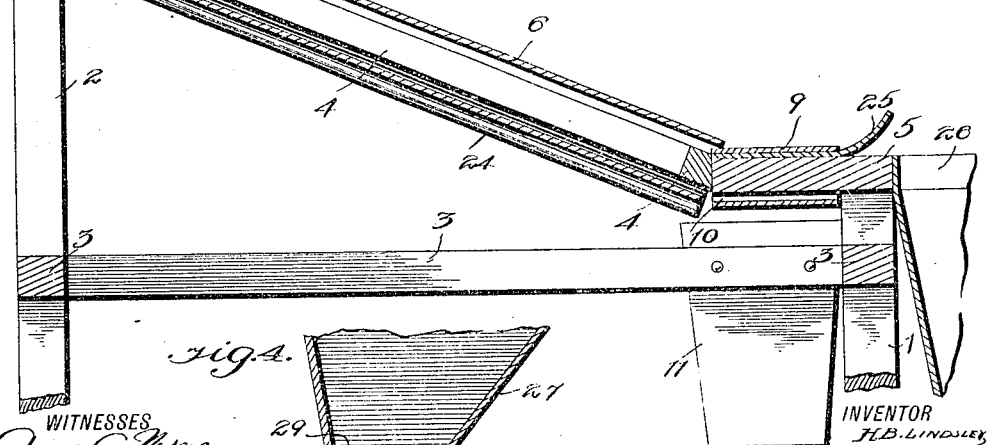
Fig. 3.
Fig. 4.
WITNESSES
George C. Hayes
INVENTOR
H. B. Lindsley
BY
Munn & Co.
ATTORNEYS

UNITED STATES PATENT OFFICE.

HARRY BRECKENRIDGE LINDSLEY, OF SLEEPY EYE, MINNESOTA.

SEPARATOR.

1,292,820.  Specification of Letters Patent.  Patented Jan. 28, 1919.

Application filed May 11, 1918. Serial No. 233,964.

*To all whom it may concern:*

Be it known that I, HARRY B. LINDSLEY, a citizen of the United States, and a resident of Sleepy Eye, in the county of Brown and State of Minnesota, have invented certain new and useful Improvements in Separators, of which the following is a specification.

My invention is an improvement in separators, and has for its object to provide a device of the character specified especially designed for separating wild peas from wheat and the like, wherein an endless moving apron is provided, arranged in inclined position, upon which the grain with the peas is poured, another endless apron being arranged in horizontal position at the lower edge of the first named apron for receiving the wheat, while a deflector is arranged at the outer side of the last named endless apron for deflecting the peas as they roll down the first named apron.

In the drawings:

Figure 1 is a perspective view of the improved separator;

Figs. 2, 3 and 4 are sections on the lines 2—2, 3—3 and 4—4, respectively, of Fig. 1, each view looking in the direction of the arrows adjacent to the line.

In the present embodiment of the invention, a suitable supporting frame is provided, the said frame consisting in the present instance of standards 1 and 2, which are connected by cross bars 3. These standards are arranged in pairs, and the members of the pair 2 are of greater height than the members of the pair 1, as shown.

An endless carrier supporting frame 4 is supported by the standards 2 and by a plate 5 to be presently described, and the said frame inclines downwardly toward the plate, as shown in Fig. 3. The endless carrier or apron 6 is supported by rollers 7 which are journaled in bearing arms 8 at the end of the supporting frame for the apron.

A second endless carrier or apron 9 is supported at the plate 5, the runs of the said apron passing above and below the plate, and this apron or carrier is supported by rollers 10 which are journaled in bearing brackets 11 on the frame. The upper run of the carrier 6 at its lower edge extends above the upper run of the carrier 9 at the adjacent edge so that grain moving down the inclined surface of the upper run of the carrier 6 will pass on to the upper run of the carrier 9, and will be delivered at the delivery end of the said carrier into a chute 11, with which a suitable container may be connected.

The rollers 10 are at the ends of the plate 5, and one of the rollers has a sprocket wheel 21 which is connected by a chain 13 with a wheel 14 on a shaft 15 journaled in bearing arms 16 extending from the frame. This shaft has a crank 17 at the end remote from the sprocket wheel 14, and is also provided with a sprocket wheel 18 adjacent to the crank. This sprocket wheel is connected by a chain 19 with a sprocket wheel 20 on the upper end of the adjacent roller 7.

A direction element 21 in the form of a roller is journaled on a shaft 22 extending laterally from the frame, and this roller is engaged by both runs of the chain 19, serving to change the direction of the said chain. At the receiving end of the upper run of the carrier 6 a guide bar 23 is secured to the adjacent standard 2 and extends downwardly above the upper run of the carrier in an inclined direction, as shown, to deflect the grain toward the carrier 9. At the opposite end there is a trough 24 for receiving the wheat from the carrier that has not been delivered on to the carrier 9.

The peas, rolling down over the inclined surface of the carrier 6, will pass over the carrier 9, since they are approximately spherical and will roll easily. The wheat, however, is of irregular shape and will not roll easily. Hence the wheat will slide down the carrier and will be held on the carrier 9, while the peas will roll over the carrier 9 and will be deflected upwardly by a deflector 25 which is arranged at the edge of the carrier 9 remote from the carrier 6. This deflector, as shown, is a plate of metal, which may be secured to the plate 5 in any suitable or desired manner, and the free edge of the plate 25 which extends beyond the edge of the carrier 9 is curved upwardly as shown.

A receiving chute 26 is supported by the outer edge of the plate 5 in position such that the peas deflected by the deflector will fall into the said chute, and a suitable receiver may be connected with the chute for receiving the peas. The grain is delivered to the carrier 6 by a hopper 27. This hopper has a feed slot 28 in one side and at its bottom, and the said slot is controlled by a gate 29 which is adjustably connected with the hopper wall. The gate has threaded stems 30 which extend outwardly through vertical slots 31 in the hopper wall, and they are engaged by wing nuts 32 outside the hopper to secure the gate in adjusted position.

In operation, the grain is placed in the hopper 27 and the gate is adjusted to the proper extent of opening. It will be noticed, referring to Fig. 1, that this feed opening faces the bar 23, that is, the grain is fed in the opposite direction to the movement of the belt. The grain is slipped down the surface of the carrier on to the carrier 9, and will be delivered by the carrier 6, the carrier 9, and the trough 24 to the chute 11, it being observed that the trough 24 delivers to the chute 11. The wild peas, rolling down the carrier 6 and over the carrier 9, will be deflected upwardly and outwardly by the deflector and will fall into the chute 26.

I claim:

1. In a machine of the character specified, a supporting frame, an endless belt supported by the frame, means for feeding mixed grain to the upper run of the belt, said belt inclining downwardly and moving to spread the mixed grain and to cause the said grain to roll down the inclined surface of the belt, with the more nearly spherical grains moving at a greater momentum than the less spherical grains, a second belt arranged at the lower edge of the upper run of the first named belt in position to receive and retard the less rapidly moving grains and adapted to discharge the more rapidly moving grains laterally and to discharge the retarded grains longitudinally.

2. In a machine of the character specified, a supporting frame, an endless belt supported by the frame, means for feeding mixed grain to the upper run of the belt near one end and one edge thereof, said belt inclining downwardly toward the opposite edge and moving to spread the mixed grain to cause the said grain to roll down the inclined surface of the belt with the more nearly spherical grains moving at a greater momentum than the less spherical grains, and a second belt arranged at the lower edge of the upper run of the first named belt in position to retard and receive the less rapidly moving grains and adapted to discharge the more rapidly moving grain laterally and to discharge the less rapidly moving grains longitudinally.

3. In a machine of the character specified, a supporting frame, an endless belt supported by the frame in inclined position, a second retarding belt arranged at the lower edge of the first named belt adapted to receive the less rapidly moving grains and deliver them at the end of the frame, and to discharge laterally the more rapidly moving grains passing over the said last named belt, and means for moving the belts in the same direction.

4. In a grain separator of the character specified, in combination, a longitudinally movable endless belt inclining downwardly toward one edge, and a grain retarding belt at the lower edge of the first named belt in position to receive, retard and convey some of the grain discharged therefrom, and adapted to discharge the more rapidly moving grains laterally and to discharge the retarded grains longitudinally, substantially as set forth.

HARRY BRECKENRIDGE LINDSLEY.

Copies of this patent may be obtained for five cents each, by addressing the "Commissioner of Patents, Washington, D. C."